（12）United States Patent
Tang et al.

(10) Patent No.: US 10,443,874 B2
(45) Date of Patent: Oct. 15, 2019

(54) METHOD FOR MULTIPOINT PURIFICATION BY ROBOTIC AIR PURIFIER

(71) Applicant: ECOVACS ROBOTICS CO., LTD., Suzhou (CN)

(72) Inventors: Jinju Tang, Suzhou (CN); Liangliang Liao, Suzhou (CN); Lei Zhu, Suzhou (CN); Maoyong Chen, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 128 days.

(21) Appl. No.: 15/515,968

(22) PCT Filed: Sep. 30, 2015

(86) PCT No.: PCT/CN2015/091261
§ 371 (c)(1),
(2) Date: May 25, 2017

(87) PCT Pub. No.: WO2016/050216
PCT Pub. Date: Apr. 7, 2016

(65) Prior Publication Data
US 2017/0261219 A1 Sep. 14, 2017

(30) Foreign Application Priority Data
Sep. 30, 2014 (CN) .......................... 2014 1 0522044

(51) Int. Cl.
*G06F 19/00* (2018.01)
*F24F 11/30* (2018.01)
(Continued)

(52) U.S. Cl.
CPC .............. *F24F 11/30* (2018.01); *A47L 9/2805* (2013.01); *B25J 9/1679* (2013.01); *B25J 13/087* (2013.01);
(Continued)

(58) Field of Classification Search
CPC .... F24F 11/30; F24F 2110/64; F24F 2110/50; F24F 2221/42; A47L 9/2805;
(Continued)

(56) References Cited

U.S. PATENT DOCUMENTS

2003/0221821 A1 12/2003 Patel et al.
2011/0271839 A1 11/2011 Kim et al.
(Continued)

FOREIGN PATENT DOCUMENTS

CN 1751651 A 3/2006
CN 101093503 A 12/2007
(Continued)

OTHER PUBLICATIONS

International Search Report, for corresponding PCT/CN2015/091261, dated Dec. 31, 2015.

*Primary Examiner* — Ronnie M Mancho
(74) *Attorney, Agent, or Firm* — Lando & Anastasi, LLP

(57) ABSTRACT

A method for multipoint purification by a robotic air purifier, comprising the following steps: S1: establishing a coordinate map of an area to be purified; S2: the robotic air purifier moves within the area to be purified according to a preconfigured movement model, measuring air quality, remembering as level-1 pollution sources those points where a pollution value exceeds a preset threshold, and marking the coordinates of said points on the coordinate map; S3: when having completed its movement over the area to be purified, the robotic air purifier moves to each level-1 pollution source point and performs an initial purification process, while at the same time measuring air quality, continuing in this way until the air quality at all said level-1 pollution sources complies with requirements.

13 Claims, 2 Drawing Sheets

Figure 1:
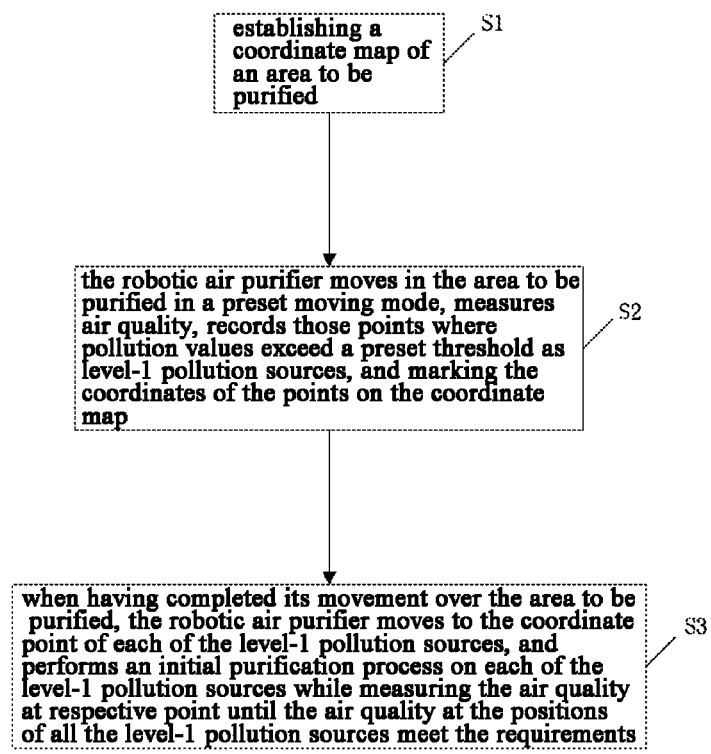

(51) Int. Cl.
*B25J 9/16* (2006.01)
*B25J 13/08* (2006.01)
*A47L 9/28* (2006.01)
*F24F 110/64* (2018.01)
*F24F 110/50* (2018.01)

(52) U.S. Cl.
CPC ....... *A47L 2201/04* (2013.01); *A47L 2201/06* (2013.01); *F24F 2110/50* (2018.01); *F24F 2110/64* (2018.01); *F24F 2221/42* (2013.01); *Y10S 901/01* (2013.01); *Y10S 901/09* (2013.01); *Y10S 901/46* (2013.01)

(58) Field of Classification Search
CPC .............. A47L 2201/04; A47L 2201/06; B25J 9/1679; B25J 13/087; Y10S 901/01; Y10S 901/09; Y10S 901/46
USPC .................................................. 700/245, 258
See application file for complete search history.

(56) References Cited

U.S. PATENT DOCUMENTS

| | | |
|---|---|---|
| 2012/0189507 A1 | 7/2012 | Ko |
| 2015/0109104 A1* | 4/2015 | Fadell .................. G08B 27/003 340/5.65 |
| 2015/0127712 A1* | 5/2015 | Fadell .................. G06Q 10/083 709/202 |
| 2015/0156031 A1* | 6/2015 | Fadell .................. H04L 12/2816 700/276 |

FOREIGN PATENT DOCUMENTS

| | | |
|---|---|---|
| CN | 101430214 A | 5/2009 |
| CN | 102221252 A | 10/2011 |
| CN | 102563801 A | 7/2012 |
| CN | 103629751 A | 3/2014 |
| CN | 203848456 U | 9/2014 |
| KR | 1020050012049 | 1/2005 |
| KR | 20120090413 A | 8/2012 |

* cited by examiner

METHOD FOR MULTIPOINT PURIFICATION BY ROBOTIC AIR PURIFIER

CROSS-REFERENCE TO RELATED APPLICATIONS

This application is a U.S. National Stage Application under 35 U.S.C. § 371 of International Application No. PCT/CN2015/091261 filed Sep. 30, 2015, titled "METHOD FOR MULTIPOINT PURIFICATION BY ROBOTIC AIR PURIFIER", which claims priority under 35 U.S.C. § 119(e) to Chinese Patent Application Serial No. 201410522044.0 filed Sep. 30, 2014, titled "MULTI-POINT CLEANING METHOD OF CLEANING ROBOT", both of which are hereby incorporated by reference in their entirety for all purposes.

FIELD OF THE INVENTION

The present invention relates to a method for multipoint purification by a robotic air purifier, which belongs to the technical field of small appliances.

BACKGROUND ART

Nowadays, with the aggravation of air pollution and the increasing in consumer's awareness of the living environment quality, a growing number of families bring into use air purifiers of various functions. Conventionally, air purifier can only be placed in a fixed point indoor. When the air purifier is used to purify the air, the air surrounding the air purifier is circulated smoothly and the air purifying effect is significant. However, it takes a long time to evenly purify the indoor air since the air purifying effect at the place away from the air purifier is relatively poor.

In view of this problem, the Chinese patent publication No. CN1313045 discloses a self-moving air purifier, which is capable of purifying the air while moving in a predetermined region so that the region could be purified more rapidly and uniformly. However, during the operation of such an air purifier, the air purifier cannot reflect the situations of the air at different points in the house, resulting in an untargeted indoor air purification. Thus, the purification cannot be performed against the pollution sources.

SUMMARY OF THE INVENTION

It is a technical objective of the present invention to provide a method for multipoint purification by a robotic air purifier to overcome the deficiencies in the prior art. With the moving of the robotic air purifier, the ambient air quality can be collected in real time and the collected data could be fed to a client side. Therefore, a targeted environmental purification may be performed by using the collected data so as to achieve the aim of purification. Furthermore, the purification points may be set artificially.

The technical objective of the present invention is realized through the following technical solutions:

Provided is a method for multipoint purification by a robotic air purifier, comprising:

Step S1: establishing a coordinate map of an area to be purified;

Step S2: the robotic air purifier moves in the area to be purified in a preset moving mode, measures air quality, records those points where pollution values exceed a preset threshold as level-1 pollution sources, and marking the coordinates of said points on the coordinate map; and Step S3: when having completed its movement over the area to be purified, the robotic air purifier moves to the coordinate point of each of the level-1 pollution sources, and performs an initial purification process on each of the level-1 pollution sources while measuring the air quality at respective point until the air quality at the positions of all the level-1 pollution sources meet the requirements.

The Step S2 further comprises: while recording the coordinates of the level-1 pollution sources, the robotic air purifier stores pollution values at the corresponding coordinate points.

The Step S3 specifically comprises: according to the coordinates of the level-1 pollution sources and the magnitude of the pollution values thereof, the robotic air purifier moves, based on a descending order of the pollution values, to the coordinate points of the level-1 pollution sources in sequence to perform air purification process and detect the air quality simultaneously, until the air quality at all the level-1 pollution sources meet the requirements.

The Step S3 is further followed by a Step S4 comprising: the robotic air purifier moves to the coordinate point of one of the level-1 pollution sources once again and detects the air quality at that point; if the pollution value is larger than a threshold value, the robotic air purifier performs the purification process again; and if the pollution value is smaller than the threshold value, the robotic air purifier moves to the coordinate point of the next level-1 pollution source, until all of the coordinate points of the level-1 pollution sources are detected and processed.

Preferably, a fixed time interval is set, and the Step S4 is performed when the fixed time interval elapses after the Step S3.

The Step S4 further comprises: while the robotic air purifier moves to a coordinate point of one level-1 pollution source once again, if it detects that the pollution value at a certain point exceeds the threshold value, the certain point is marked as a level-2 pollution source, and the coordinates of the level-2 pollution source is recorded and the pollution value at the certain point is stored simultaneously.

The Step S4 is further followed by a Step S5 comprising: according to the coordinates of the level-2 pollution sources and the magnitude of the pollution values thereof, the robotic air purifier moves, based on a descending order of the pollution values, to the coordinate points of the level-2 pollution sources in sequence to perform air purification process and detect the air quality simultaneously, until the air quality at all the level-2 pollution sources meet the requirements.

The Step S5 is further followed by a Step S6, and the Step S6 specifically comprises:

Step S6.1: according to the coordinates of the level-1 pollution sources and the level-2 pollution sources as well as the magnitude of the pollution values of the level-1 pollution sources and the level-2 pollution sources, the robotic air purifier moves, based on a descending order of the pollution values, to the coordinate points of the level-1 pollution sources and the level-2 pollution sources in sequence to perform air purification process and detect the air quality simultaneously, and determines if all of the pollution values of the level-1 and level-2 pollution sources are smaller than the threshold value; if "yes", the process proceed to a Step S6.2; and if "no", continuing to perform the Step S6.1 until all of the pollution values of the level-1 and level-2 pollution sources are smaller than the threshold value;

Step S6.2: the robotic air purifier automatically updates the threshold value; and Step S6.3: the robotic air purifier monitors the air quality in the area to be purified and performs the purification process according to the updated threshold value.

There is a fixed time interval set between the Step S5 and the Step S6.

The coordinate map of the area to be purified in the Step S1 is established by a fuzzy memory algorithm.

Alternatively, the coordinate map of the area to be purified in the Step S1 is established based on the distance data obtained by measuring the distance between the robotic air purifier and obstacles with a distance measuring device provided on the robotic air purifier.

Preferably, in the Step S2, the preset moving mode is an N-shaped moving mode.

For purpose of purifying more thoroughly, in Step S3, the robotic air purifier moves in a spiral mode in the area where the coordinate points of the level-1 pollution source locate and purifies the level-1 pollution sources.

According to the method for multipoint purification by a robotic air purifier of the present invention, with the moving of the robotic air purifier, the air quality in the environment may be collected in real time and the collected data is fed to a client side, and then perform multiple targeted monitoring and purifications on the environment by using the collected data so as to achieve the purpose of effective purification. By this way, the situation in the prior art where the just purified air is polluted again by the polluted air flow caused by a constantly flowing of air is avoided, resulting in cleaner air purified more evenly. The present method for multipoint purification by a robotic air purifier resolves the problem of one-time purification in the prior art that the purified locations are contaminated again by the air flowing from the yet unpurified locations as a result of air flow. Further, the purification points may be set artificially.

The technical solution of the present invention now will be described in detail with reference to the accompanying drawings and specific embodiments.

DESCRIPTION OF ATTACHED DRAWINGS

Figure 2:
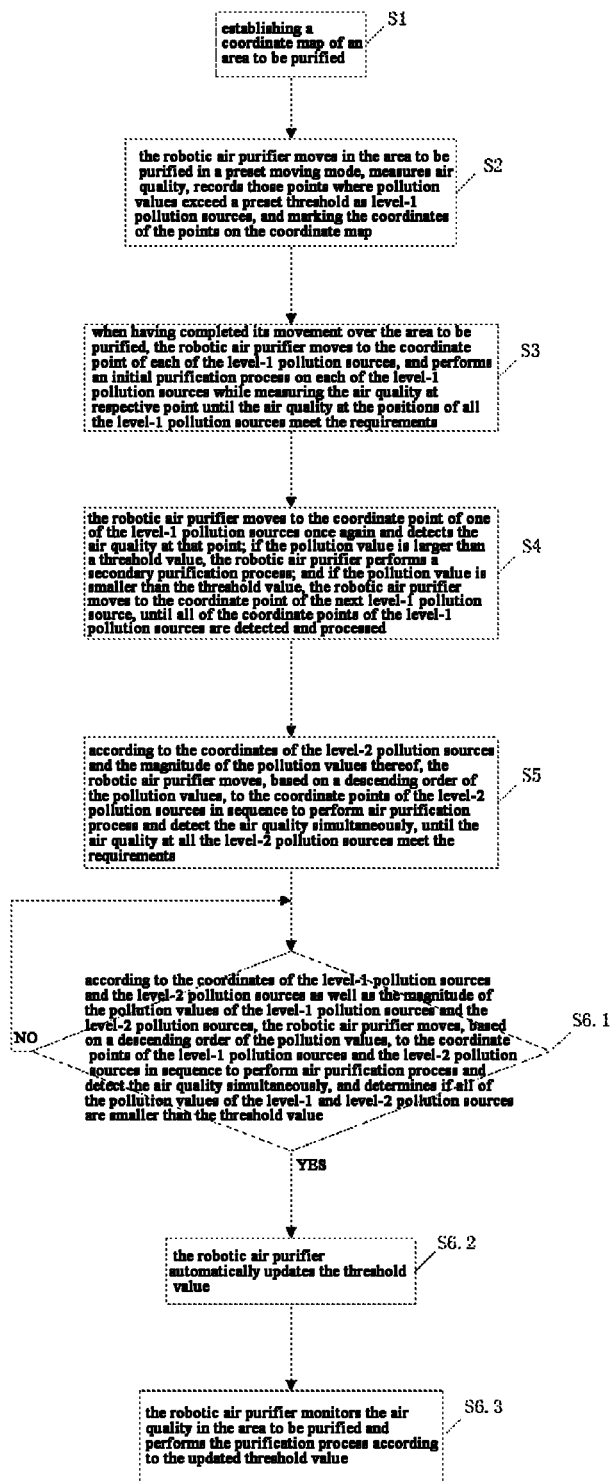

FIG. 1 is a flow chart illustrating the steps of the multipoint purification method according to the first embodiment of the present invention; and FIG. 2 is a flow chart illustrating the steps of the multipoint purification method according to the second embodiment of the present invention.

DETAILED DESCRIPTION OF PREFERRED EMBODIMENTS

FIG. 1 is a flow chart illustrating the steps of the multipoint purification method according to the first embodiment of the present invention. As shown in FIG. 1, the method for multipoint purification by a robotic air purifier comprises the following steps:

Step S1: establishing a coordinate map of an area to be purified. Specifically, the robotic air purifier establishes the coordinate map of the area to be purified based on the distance data obtained by measuring the distance between the robotic air purifier body and the obstacle by a distance measuring device, or establishes the coordinate map of the area to be purified by a fuzzy memory algorithm. More specifically, the fuzzy memory algorithm is an algorithm in which the amount of position offset with respect to a starting point is acquired by the coded disc and then the process goes back to the starting point by memorizing the offset. The whole area may be covered by multiple operations of the algorithm and the coordinate map of the area to be purified may be established.

Step S2: the robotic air purifier moves in the area to be purified in a preset moving mode, measures air quality, records those points where pollution values exceed a preset threshold as level-1 pollution sources, and marks the coordinates of said points on the coordinate map while storing the pollution values at said points. Specifically, the preset moving mode is one of an N-shaped moving mode, keeping-to-the-side moving mode or random moving mode or a combination thereof. It is to be noted that, in Step 2, the air quality acquisition system (including gas sensors such as a dust particle sensor, a CO sensor, a formaldehyde sensor, a PM2.5 sensor) may measure the dust particle, harmful gas and so on in the air in real time and then send the obtained data to a control system. The control system may perform processing operation on the obtained data. When the obtained pollution value of the air quality is larger than a threshold value, it is determined that there is a pollution source and the coordinates of the pollution source is recorded. Since the pollution source is detected for the first time, the pollution source is defined as a level-1 pollution source. After the robot completes its moving over the area to be purified, the coordinates of all of the pollution sources in the area to be purified have been recorded. Preferably, the robotic air purifier may further store the specific pollution values to enable the robot to give priority to a pollution source with the largest pollution value.

Step S3: when having completed its movement over the area to be purified, the robotic air purifier moves to the coordinate point of each of the level-1 pollution sources, and performs an initial purification process on each of the level-1 pollution sources while measuring the air quality at respective point until the air quality at the positions of all the level-1 pollution sources meet the requirements. Specifically, if the specific coordinates and the pollution values of the pollution sources have been recorded in Step S2, according to the coordinates of the level-1 pollution sources and the magnitude of the pollution values thereof, the robotic air purifier may move, along a moving path based on the pollution values in descending order, to the coordinate points of the level-1 pollution sources in sequence to perform air purification process and detect the air quality at the same time until the air quality at the positions of all the level-1 pollution sources meet the requirements. During this period, the robotic air purifier usually moves in a spiral mode in the area where coordinate points of the level-1 pollution source locate and purifies the level-1 pollution sources. Alternatively, the robotic air purifier may just stay at a coordinate point of a pollution source to perform air purification process.

In the present embodiment, the robotic air purifier may complete the initial purification on the area to be purified by performing the initial purification according to the detected level-1 pollution sources so as to reduce the pollution values in the area of the pollution sources to be smaller than a threshold value.

Second Embodiment

FIG. 2 is a flow chart illustrating the steps of the multipoint purification method according to the second embodiment of the present invention. By comparison with FIG. 1, the steps of the present embodiment are substantially the same as those in the first embodiment, and the two embodiments differ in that, for the purpose of further eliminating the influence of air flow and preventing the pollution source from reappearing, subsequently the robotic air purifier may monitor the above processed pollution sources. In the present embodiment, Step S3 is followed by:

Step S4: the robotic air purifier moves to a coordinate point of one level-1 pollution source once again and detects the air quality at that point; if the pollution value is larger than a threshold value, the robotic air purifier performs a secondary purification process; and if the pollution value is smaller than the threshold value, the robotic air purifier moves to a coordinate point of the next level-1 pollution source, until all coordinate points of the level-1 pollution sources are detected and processed.

Furthermore, in Step S4, during the process that the robotic air purifier moves to a coordinate point of one level-1 pollution source once again, if it detects that a pollution value at a certain point exceeds the threshold value, the certain point is marked as a level-2 pollution source, and the coordinates of the level-2 pollution source is recorded and the pollution value at that position is stored simultaneously.

Step S5: according to the coordinates of the level-2 pollution sources and the magnitude of the pollution values thereof, the robotic air purifier may move, along a moving path based on the pollution values in descending order, to the coordinate points of the level-2 pollution sources in sequence to perform air purification process and detect the air quality at the same time until the air quality at the positions of all the level-2 pollution sources meet the requirements, wherein the robotic air purifier performs the purification in a spiral moving mode during purifying the level-2 pollution sources.

It should be noted that a fixed time interval may be set between Step S3 and Step S4, and when the fixed time interval elapses after Step S3, Step S4 is performed. The time interval can be set as needed.

Step S6.1: according to the coordinates of the level-1 pollution sources and the level-2 pollution sources as well as the magnitude of the pollution values of the level-1 pollution sources and the level-2 pollution sources, the robotic air purifier may move, along a moving path based on the pollution values in descending order, to the coordinate points of the level-1 pollution sources and the level-2 pollution sources in sequence to perform air purification process and detect the air quality at the same time, and determines if all of the pollution values of the level-1 and level-2 pollution sources are smaller than the threshold value; if "yes", the process proceed to Step S6.2; and if "no", continuing to perform Step S6.1 until all of the pollution values of the level-1 and level-2 pollution sources are smaller than the threshold value;

Step S6.2: the robotic air purifier automatically updates the threshold value; and Step S6.3: the robotic air purifier monitors the air quality in the area to be purified and performs the purification process according to the updated threshold value.

It should be noted that there is a fixed time interval between Step S5 and Step S6. The time interval can be set as needed.

In the present embodiment, in order to further eliminate the influence of air flow and prevent the pollution source from reappearing, the robotic air purifier may detect and purify the level-1 pollution sources again while monitoring the ambient air out of the level-1 pollution sources to see whether it complies with the threshold. By this way, the area to be purified is purified again and the decreasing in the air quality caused by repeatedly pollution is inhibited. It is also a kind of further-monitoring on the initial purification operation. Further, in order to effectively perform purification and avoid the situation in the prior art that the just purified air is polluted again by the polluted air flow caused by constant flowing of air, in Step S6, the area to be purified is further deeply purified in addition to be purified for the second time. It should be noted that in the present embodiment, if no pollution value being larger than the threshold value is detected in Step S4, the air quality in the area to be purified is qualified.

The invention claimed is:

1. A method for multipoint purification by a robotic air purifier, the method comprising:
   establishing a coordinate map of an area to be purified;
   the robotic air purifier moves in the area to be purified in a preset moving mode, measures air quality, records positions where pollution values exceed a preset threshold as level-1 pollution sources, and marks coordinates of the positions on the coordinate map; and
   when having completed its movement over the area to be purified, the robotic air purifier moves to the coordinates of each of the positions, and performs an initial air purification process on each of the level-1 pollution sources while measuring air quality at respective positions until the air quality at positions of all the level-1 pollution sources meet requirements.

2. The method of claim 1, wherein the robotic air purifier moving in the area to be purified in the preset moving mode comprises while recording coordinates of the level-1 pollution sources, the robotic air purifier stores pollution values at corresponding coordinates.

3. The method of claim 2, wherein according to the coordinates of the level-1 pollution sources and magnitudes of the pollution values thereof, the robotic air purifier moves, based on a descending order of the pollution values, to the coordinates of the level-1 pollution sources in sequence to perform the initial air purification process and detect the air quality simultaneously, until the air quality at all the level-1 pollution sources meet the requirements.

4. The method of claim 1, further comprising:
   the robotic air purifier moves to the position of one of the level-1 pollution sources once again and detects the air quality at that position;
   if the pollution value is larger than a threshold value, the robotic air purifier performs a secondary air purification process; and
   if the pollution value is smaller than the threshold value, the robotic air purifier moves to the position of the next level-1 pollution source, until all of the level-1 pollution sources are detected and processed.

5. The method of claim 4, wherein a fixed time interval is set, and when the fixed time interval elapses after performing the initial air purification process on each of the level-1 pollution sources, the secondary air purification process is performed on each level-1 pollution source at which the pollution value is larger than the threshold value.

6. The method of claim 4, further comprising: while the robotic air purifier moves to a position of one level-1 pollution source once again, if it detects that the pollution value at the position exceeds the threshold value, the position is marked as a level-2 pollution source, and coordinates of the level-2 pollution source is recorded and the pollution value at the position is stored simultaneously.

7. The method of claim 6, further comprising: according to the coordinates of the level-2 pollution sources and magnitudes of the pollution values thereof, the robotic air purifier moves, based on a descending order of the pollution values, to the positions of the level-2 pollution sources in sequence to perform the secondary air purification process and detect the air quality simultaneously, until the air quality at all the level-2 pollution sources meet the requirements.

8. The method of claim 7, further comprising:

according to the coordinates of the level-1 pollution sources and the level-2 pollution sources as well as the magnitudes of the pollution values of the level-1 pollution sources and the level-2 pollution sources, the robotic air purifier moves, based on a descending order of the pollution values, to the positions of the level-1 pollution sources and the level-2 pollution sources in sequence to perform the secondary air purification process and detect the air quality simultaneously, and determines if all of the pollution values of the level-1 and level-2 pollution sources are smaller than the threshold value; if "yes", the robotic air purifier automatically updates the threshold value; and if "no", the robotic air purifier continues to perform the secondary air purification process until all of the pollution values of the level-1 and level-2 pollution sources are smaller than the threshold value;

and the robotic air purifier monitors the air quality in the area to be purified and performs the secondary purification process according to the updated threshold value.

9. The method of claim 8, wherein there is a fixed time interval set between the robotic air purifier moving, based on a descending order of the pollution values, to the positions of the level-2 pollution sources in sequence to perform the secondary air purification process and detect the air quality simultaneously until the air quality at all the level-2 pollution sources meet the requirements, and the robotic air purifier moving, based on a descending order of the pollution values, to the coordinate positions of the level-1 pollution sources and the level-2 pollution sources in sequence to perform the secondary air purification process and detect the air quality simultaneously, and determining if all of the pollution values of the level-1 and level-2 pollution sources are smaller than the threshold value.

10. The method of claim 1, wherein the coordinate map of the area to be purified is established by a fuzzy memory algorithm.

11. The method of claim 1, wherein the coordinate map of the area to be purified is established based on distance data obtained by measuring distances between the robotic air purifier and obstacles with a distance measuring device provided on the robotic air purifier.

12. The method of claim 1, wherein the preset moving mode is an N-shaped moving mode.

13. The method of claim 1, wherein the robotic air purifier moves in a spiral mode in an area where the level-1 pollution sources are located and purifies the level-1 pollution sources.

* * * * *

UNITED STATES PATENT AND TRADEMARK OFFICE
CERTIFICATE OF CORRECTION

PATENT NO.         : 10,443,874 B2
APPLICATION NO.    : 15/515968
DATED              : October 15, 2019
INVENTOR(S)        : Jinju Tang et al.

Page 1 of 1

It is certified that error appears in the above-identified patent and that said Letters Patent is hereby corrected as shown below:

In the Claims

Column 8, Claim 9, Line number 7, insert -- points -- between "coordinate" and "positions".

Signed and Sealed this
Nineteenth Day of November, 2019

Andrei Iancu
*Director of the United States Patent and Trademark Office*